(12) United States Patent
Bunyk

(10) Patent No.: US 6,917,537 B2
(45) Date of Patent: Jul. 12, 2005

(54) RSFQ BATCHER-BANYAN SWITCHING NETWORK

(75) Inventor: Paul I Bunyk, Redondo Beach, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 110 days.

(21) Appl. No.: 10/638,180

(22) Filed: Aug. 11, 2003

(65) Prior Publication Data

US 2005/0035368 A1 Feb. 17, 2005

(51) Int. Cl.$^7$ ............................................... G11C 11/00
(52) U.S. Cl. ........................ 365/154; 370/380; 370/411
(58) Field of Search ................................ 370/380, 386, 370/387, 388, 357, 360, 391, 398, 411, 416, 418, 424, 427; 438/580, 581–583, 680, 681, 648–656, 660, 664, 672, 675, 682–684, 688, 630; 365/154, 185.17, 230.01

(56) References Cited

U.S. PATENT DOCUMENTS

| | | | |
|---|---|---|---|
| 5,392,189 A | 2/1995 | Fazan et al. | 361/305 |
| 5,717,250 A | 2/1998 | Schuele et al. | 257/754 |
| 5,892,254 A | 4/1999 | Park et al. | 257/295 |
| 6,096,640 A * | 8/2000 | Hu | 438/652 |
| 6,103,622 A * | 8/2000 | Huang | 438/652 |
| 6,162,671 A | 12/2000 | Lee et al. | 438/238 |
| 6,362,086 B2 * | 3/2002 | Weimer et al. | 438/591 |
| 6,444,557 B1 * | 9/2002 | Biolsi et al. | 438/597 |
| 6,455,424 B1 | 9/2002 | McTeer et al. | 438/675 |
| 6,531,730 B2 | 3/2003 | Sandhu et al. | 257/310 |
| 6,596,595 B1 * | 7/2003 | Weimer et al. | 438/287 |

OTHER PUBLICATIONS

K. Batcher, "Sorting Networks and their Applications," AIFPS Spring Joint Computer Conference Proceedings, vol. 32, pp 307–314, 1968.

Bunyk, Likharev and Zinoviev, "RFSQ Technology: Physics and Devices," International Journal of High Speed Electronics and Systems, vol. 11, No. 1 (2001), pp 257–305, World Scientific Publishing.

Hickey & Marcus, "The Implementation of a High Speed ATM Packet Switch using CMOS VLSI," XIII International Switching Symposium Proceedings, vol. 1, pp 75–84, Stockholm, May 1990.

Wittie, Yu, Zinoviev, Sazaklis & Likareve, "CNET Petaflops–Scale Computing," IEEE Transactions on applied Superconductivity, vol. 9, No. 2, Jun. 1999, pp4034–4039.

Kamada, Yorozu & Tahara, "SFQ Standard Cell –based Circuit Design of an Internal Link Speeded–Up Batcher–Banyan Packet Switch," IEEE Transactions Applied Superconductivity, vol. 11, No. 1 Mar. 2001, pp 322–325.

\* cited by examiner

*Primary Examiner*—David Nhu
(74) *Attorney, Agent, or Firm*—Ronald M. Goldman; Scot R. Hewitt

(57) ABSTRACT

Superconductor technology and Batcher banyan switching technology are combined and implemented as a practical component in a single cryo-MCM substrate (10) containing a plurality of superconductor chips (37, 38, 39, 41, 42, 43, 44, 46, 48, 49, 51, 53 and 55) arranged in a plurality of rows and columns. Wiring (52) on the substrate connects the chips in each row of a number of the columns (41, 43, 45, 47, 49, 51 & 53) serially to collectively define a Batcher sorter. Other wiring (52) connects the chips in each row of a number of other columns (40, 42, 44 & 48) in reverse banyan and banyan networks. The foregoing includes a novel superconductor Batcher two-bit serial sorter (FIG. 8) and trap (FIG. k9).

2 Claims, 10 Drawing Sheets

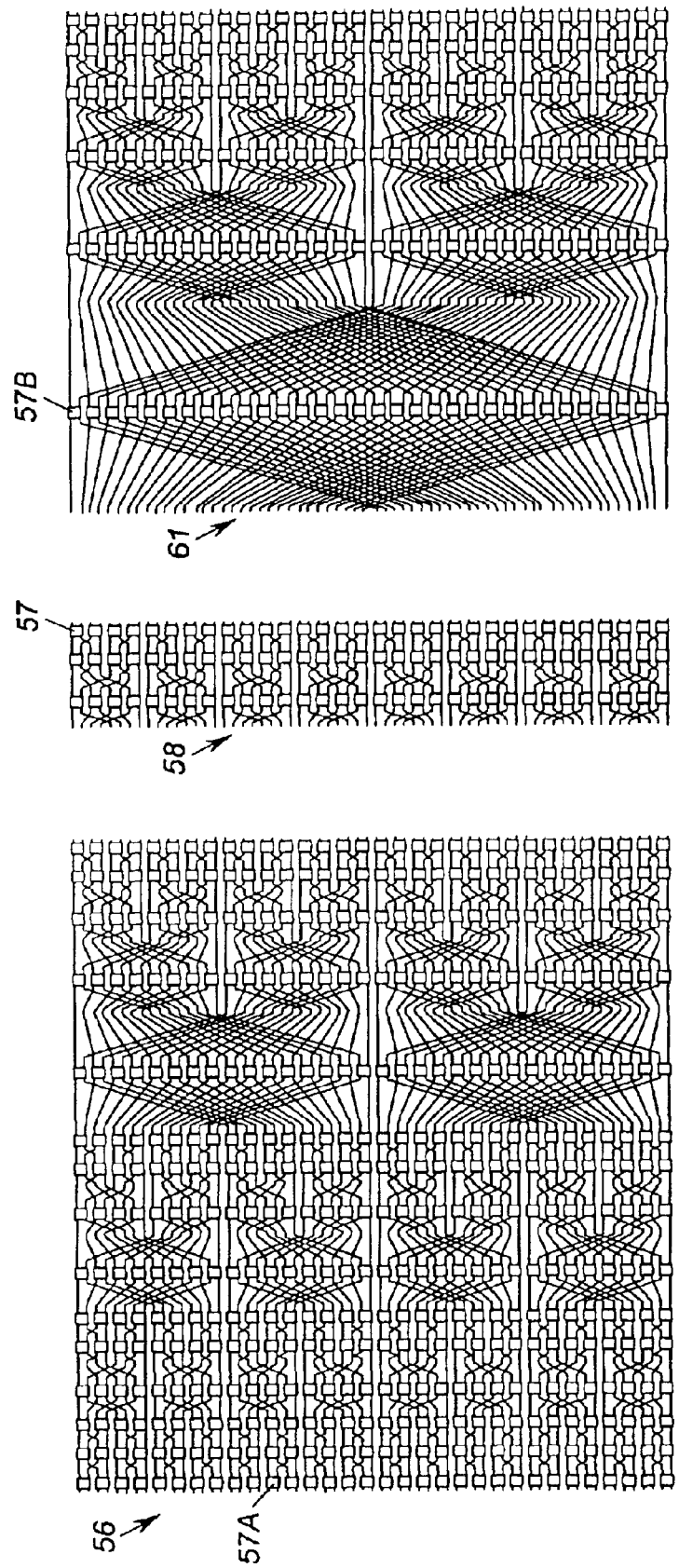

RSFQ BATCHER-BANYAN SWITCHING NETWORK

REFERENCE TO RELATED APPLICATIONS

This application makes reference to U.S. application of Michael S. Wire & Quentin P. Herr, entitled Transmission Line Single Flux Quantum Chip-to-Chip Communication with Flip-Chip Bump Transitions, Ser. No. 09/935,037, filed Aug. 22, 2001; and to U.S. application of Quentin P. Herr, entitled Double Flux Quantum Superconductor Driver, Ser. No. 09/934,493, filed Aug. 22, 2001, now U.S. Pat. No. 6,580,310.

FIELD OF THE INVENTION

This invention relates to high speed packet switching networks, and, more particularly, to a superconductor non-blocking self-routing Batcher-Banyan network for optical communication networks and high-bandwidth supercomputers, to a rapid single flux quantum two-bit serial sorting network for use in a superconductor non-blocking self-routing Batcher-Banyan packet switching network, and to an SFQ trap circuit for that same network.

BACKGROUND OF THE INVENTION

Transmission of digital data over great distances is currently accomplished by digital networks, such as the familiar "internet". In that network, digital data propagates over the network as individual packets or, as variously termed, cells of serial binary data. The cell includes at least the information that the sender desires to have delivered to the recipient and the address of the intended recipient station or computer. The network is designed to use the destination address to route the cell over the digital network, that is, permits the packet or cell to be self-routing.

The digital network typically requires a number of component electronic devices, also referred to as switching networks or switches that assist the migration or propagation of the cells through the transmission network. One of those component electronic devices is known as the Batcher-banyan network. The Batcher-banyan network is a class of multi-stage switching network that permits data cells arriving at any one of the multiple inputs to the network to propagate to any of the multiple outputs of the network. That network is formed of a combination of a Banyan switching network and a Batcher sorting network.

The Banyan switching network is described, for one, in an article by L. R. Goke and G. J. Lipovski, entitled Banyan Networks for Partitioning Multi-Processing Systems, Proceedings 1$^{st}$ Annual Computer Architecture Conference, pp 21–28, December 1973. The Banyan switching network or switch possesses the capability of transferring multiple cell inputs simultaneously to multiple outputs, but with an inherent limitation or problem. That transfer is low in efficiency due to the possibility of a cell collision arising in the inner part or output lines of the switch, which causes internal blocking. That is, when sending several cells from different inputs to propagate to different outputs, two or more of those cells may well attempt to take the same circuit link through a part of the network taken by another of the inputted cells. That action produces a cell "collision". As a consequence, one or the other of the colliding cells needs to be dropped or delayed, and the dropped or delayed cell would need to be re-presented to the network later. That cell action (and reaction) lowers the efficiency of cell transfer.

However, the banyan network is internally non-blocking if two conditions are met: (1) All active cells are presented to the network sorted in order by destination and (2) no inactive cells (e.g. cells that contain no data so that the data section is a string of "0's") are positioned between the active cells. The first condition is satisfied by pre-pending the banyan network with the Batcher sorting network. The function of the Batcher sorting network is described in a article by the inventor of the network, Mr. K, Batcher, in an article entitled "Sorting Networks and their Applications", AIFPS Spring Joint Computer Conference Proceedings, Volume 32, pp 307–314, 1968. To satisfy the second condition a so-called concentrator network is placed between the Batcher and banyan stages.

When several of the input cells have the same destination address and seek to propagate to the same output, an event termed output contention, it is necessary to detect and resolve that impossible situation. Resolution of the contention is accomplished by including a trap network or, as variously termed, trap in between the Batcher and concentrator stages of the Batcher-Banyan network. The present invention encompasses an improvement to the Batcher-Banyan network, particularly to the switching core to the network, to a novel routing circuit employed in that network and to a novel trap network.

One approach to increasing the information carrying capacity of a digital transmission network is by increasing the transmission speed at which the data cells move over the network. The Batcher-Banyan network bit serial routing and switching network architectures that utilize such routing were successfully implemented previously in conventional voltage-state semiconductor logic e.g., Asynchronous Mode Switches ("ATM") switches. That semiconductor logic operates at hundreds of megahertz to several gigahertz data processing clock frequency as compared to the greater data processing speeds of operation of the newly evolving superconductor device technology, to which the present invention is directed, at link rates of 10 to 40 to 60 gbps. Superconductor devices, herein referred to as SFQ or RSFQ devices, are known that emulate various kinds of semiconductor logic devices, such as flip-flops and other gates, but operate at significantly faster speeds and with much lower power consumption.

SFQ is an acronym for single flux quantum. That term is used herein interchangeably with RSFQ, which stands for rapid single flux quantum, an alternative phrase used by some who prefer to emphasis the high speed of superconductor devices. The SFQ (and RSFQ) designation indicates that the particular device that follows the designation incorporates one or more Josephson Junctions as an active element or elements and relies on quantum-mechanical phenomena called "magnetic flux quantization". SFQ devices process information by counting individual magnetic flux quanta, unlike other families of Josephson Junction logic, the so-called "voltage states" or "latching" logic. As is known, for operation SFQ devices must be held in an environment that maintained at cryogenic temperatures; and those devices must be supplied with appropriate DC bias currents. As an advantage, the present invention employs SFQ devices configured to function as a Batcher-Banyan network to enable significant enhancement in the speed with which data cells are routed. A secondary advantage is that the power dissipated in the switching core is significantly reduced relative to one formed of conventional semiconductor logic.

Since the semiconductor type Batcher-Banyan network includes a two-bit serial sorter and a trap, an SFQ Batcher-Banyan network must of necessity include counterpart SFQ devices to accomplish the sorter and trap functions. As corollary inventions, the present invention provides a new configuration in SFQ devices that provides an SFQ bit-sorter and an SFQ trap.

Accordingly, a principal object of the present invention is to provide true packet switching at optical speeds of 40 to 60 Gbps and beyond.

Another object of the invention is to miniaturize a Batcher Banyan superconductor network switching core, and fit that network switching core in a single cryo-multi-chip module.

A further object of the invention is to create an SFQ two-bit serial sorter that is capable of routing packets of SFQ pulses, and is able to support an arbitrary number of priority bits.

A still further object of the invention is to provide an SFQ trap that is able to compare addresses of two separate SFQ cells and, when the cell addresses are identical, blocks transmission of the cell with lowest priority.

SUMMARY

In accordance with the foregoing objects, the invention integrates superconductor technology with Batcher banyan switching technology to provide a practical superconductor Batcher-banyan switching circuit embodied on a single cryo-MCM substrate, supporting a plurality of superconductor chips arranged in a plurality of rows and columns. Wiring on the substrate connects the superconductor chips in each row of a number of the columns serially to collectively define a Batcher sorter. Other wiring on that substrate connects the superconductor chips in each row to a number of other columns in reverse banyan and banyan networks. An SFQ trap is included between the Batcher sorter and the reverse banyan and banyan networks.

An ancillary aspect of the invention comprises a SFQ Batcher two-bit serial sorter which is included within the preferred embodiment of the switching circuit. That serial sorter is novel and constitutes an ancillary invention. As a further feature, an superconductor trap is included within the principal invention and also constitutes an ancillary invention.

The foregoing and additional objects and advantages of the invention, together with the structure characteristic thereof, which were only briefly summarized in the foregoing passages, will become more apparent to those skilled in the art upon reading the detailed description of a preferred embodiment of the invention, which follows in this specification, taken together with the illustrations thereof presented in the accompanying drawings.

BRIEF DESCRIPTION OF THE DRAWINGS

In the drawings:

FIG. 5 illustrates the wiring pattern or topology for the SFQ chips labeled A that appear in one column of the layout of FIG. 4, with the small rectangular blocks symbolically representing the region containing the Josephson junctions in a switching circuit;

FIG. 6 illustrates the wiring pattern or topology for the SFQ chips labeled B and E that appear in a number of the columns of SFQ chips in presented in the layout of FIG. 4, with the small rectangular blocks symbolically representing the region containing the Josephson junctions in a switching circuit;

FIG. 7 illustrates the wiring pattern or topology for the SFQ chips labeled C and D that appear in a number of columns of SFQ chips presented in the layout of FIG. 4, with the small rectangular blocks symbolically representing the region containing the Josephson junctions;

FIG. 10a illustrates an SFQ pulse splitter;

FIG. 10b illustrates an SFQ pulse merger device;

FIG. 10c illustrates an SFQ clocked Exclusive OR ("XOR");

FIG. 10d illustrates an SFQ $D^2$ flip-flop (or latch);

FIG. 10e illustrates an SFQ D flip-flop;

FIG. 10f illustrates an SFQ Non-Destructive Read-Out (NDRO) flip-flop (memory cell);

FIG. 10g illustrates an SFQ NDRO demux formed with two NDRO's;

FIG. 10h illustrates an SFQ shift register formed of a chain of D flip-flops;

DETAILED DESCRIPTION OF THE PREFERRED EMBODIMENTS

Figure 1:
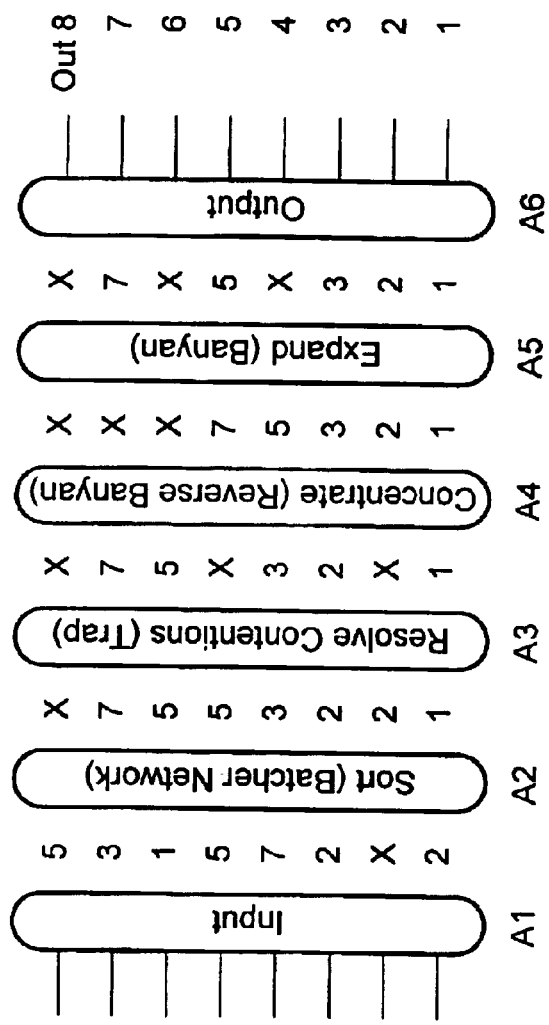
FIG. 1 is a functional diagram, presented as introduction, that illustrates the operation of a Batcher Banyan switching network of the prior art as embodied in a small size NxN network in which N equals 8.

FIG. 1 is a functional diagram of the operation (e.g. the algorithm) of a Batcher Banyan switching network of the prior art. The diagram provides an easy-to-understand illustration of the propagation of active cells through a small size Batcher banyan network, namely an 8x8 network. Instead of containing 512 inputs and outputs, as in the preferred embodiment later herein described, the much smaller number of eight inputs and outputs is sufficient to illustrate the network function without distracting complexity. Accordingly, the switching network of FIG. 1 contains eight input lines (or inputs) at input stage, A1, for receiving up to eight packets or cells essentially simultaneously. Those multiple inputs are arranged in a column. The network also contains eight output lines or outputs, A6, through which to possibly simultaneously output some or all of the received data cells. Those outputs are also arranged in a column. In this diagram, the address for a data cell (e.g. the destination port) is represented by a single Arabic numeral of 1 through 8, and represents an associated cell. Any input that is not in use, that is, is not receiving a cell over an associated input line, is considered idle, and is denoted by an X. That idle input may also be referred to herein as an empty cell. The vertical columns to the right of each stage in the diagram shows the position of the same set of numbered cell addresses following each stage A1 through A6 of the network. Thus, as received at the router, the data cells are received at input stage A1 and the individual addresses of those cells are distributed randomly amongst the network inputs.

The addresses of the incoming data cells are listed in order from top to bottom as 5, 3, 1, 5, 7, 2, X, and 2. The addresses are not atypical. Two of those data cells contain the same address, "2". Another two data cells contain the same address, 5, and one of the inputs did not receive a cell and is empty as illustrated by the "X". The first step of network operation is to sort (e.g. rank) the data cells in order by address which is the function of sort stage A2, whereupon the cells are rearranged at the output of the sort as X, 7, 5, 5, 3, 2, 2, & 1. That sort is accomplished by the Batcher sorting network. The next step at A3 is to resolve any contentions amongst the various cells for the same output address, such as the data cells contending for addresses 2 and 5. That contention is resolved by selecting the one data cell from amongst the contending data cells that is marked with the highest priority (the priority level of the cells not being illustrated in the figure).

Contention resolution is accomplished by a trap. Thus, the trap permits only one of the cells for each of addresses 5 and 2 is permitted to advance through to the next stage of the network. That leaves the cells associated with addresses X, 7, 5, X, 3, 2, X & 1 to be presented to concentration stage A4. The lower priority cells, those which lost out in the contention resolution operation, are either dropped (e.g. discarded) or, preferably, the source from which the cells originated is informed of the dropped cell and may then reassert the cell to the network a short time later.

Concentration A4 is accomplished by a reverse Banyan network. Concentration is the process of arranging the data packets in order from highest to lowest address, with any empty cells concentrated at the highest order. This produces an order for the cells of X, X, X, 7, 5, 3, 2 and 1 at the output of the reverse Banyan network. The concentrated cells then are applied to the Expand stage A5, which directs each cell onto the line associated with the respective cell address. At the output A6 of the expand stage the foregoing cells are arranged in the following order of X, 7, X, 5, X, 3, 2 & 1. The expand function is accomplished by a Banyan circuit. Each cell arrives at output A6 at the desired output line, as example, the packet addressed to output 7, is present at output number 7, while the unused output addresses, such as 8, receive empty cells X.

The foregoing brief description of the function of the network describes both those Batcher banyan networks found in prior systems that employ semiconductor switches as well as the function (e.g. algorithm) performed by the present invention, later herein described.

Figure 2:
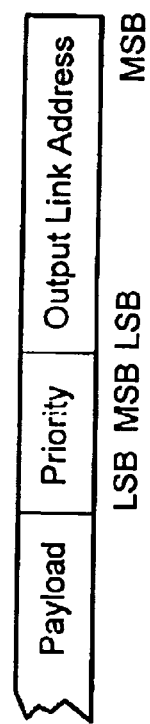
FIG. 2 is a diagram of a data packet or cell that is used to send data in the asynchronous transmission mode through the switching network of the present invention.

In practice the address (and other information) in a cell is in a binary representation. A self routing binary data cell comprises a collection of digital binary bits, a bit in the binary system being either a "1" or "0" (or "high" or "low"), that contains information in digital form. In the system, that collection of digital information is serially transmitted bit by bit. In an SFQ system, the digital binary "1" is formed by the presence of an SFQ pulse, and a digital binary "0" by the absence of a SFQ pulse in the appropriate serial time slot or data position in the cell. The cell address forms one group (of bits) or section of the multiple sections that form a cell. The cell contains a variety of digital data, such as is illustrated in FIG. 2 to which reference is made.

The collection of information in a cell is formatted by the system designer to fit the designer's requirements or to confirm to an industry standard. The format of a cell typically includes an output link address or, simply, address, the priority assigned to the information, and the information or payload that is intended to be delivered to the location addressed. Each section of the cell is constituted of the number of bits in length prescribed by the designer, as is the overall length of the cell (e.g. the number of bits). The cell is formatted with the address (e.g. the intended destination) at the head of the cell followed by the assigned priority information. The payload, the data, typically the cell section that is the greatest in length, follows at the end of the cell. Further, both the address and the priority are formatted with the most significant bit ("MSB") appearing first in the serial order of the respective cell sections. With the MSB arranged in that way, the network apparatus is able to more quickly determine which cell address is of a higher number and which priority is higher when comparing the addresses and/or priority level of different cells.

Figure 3:
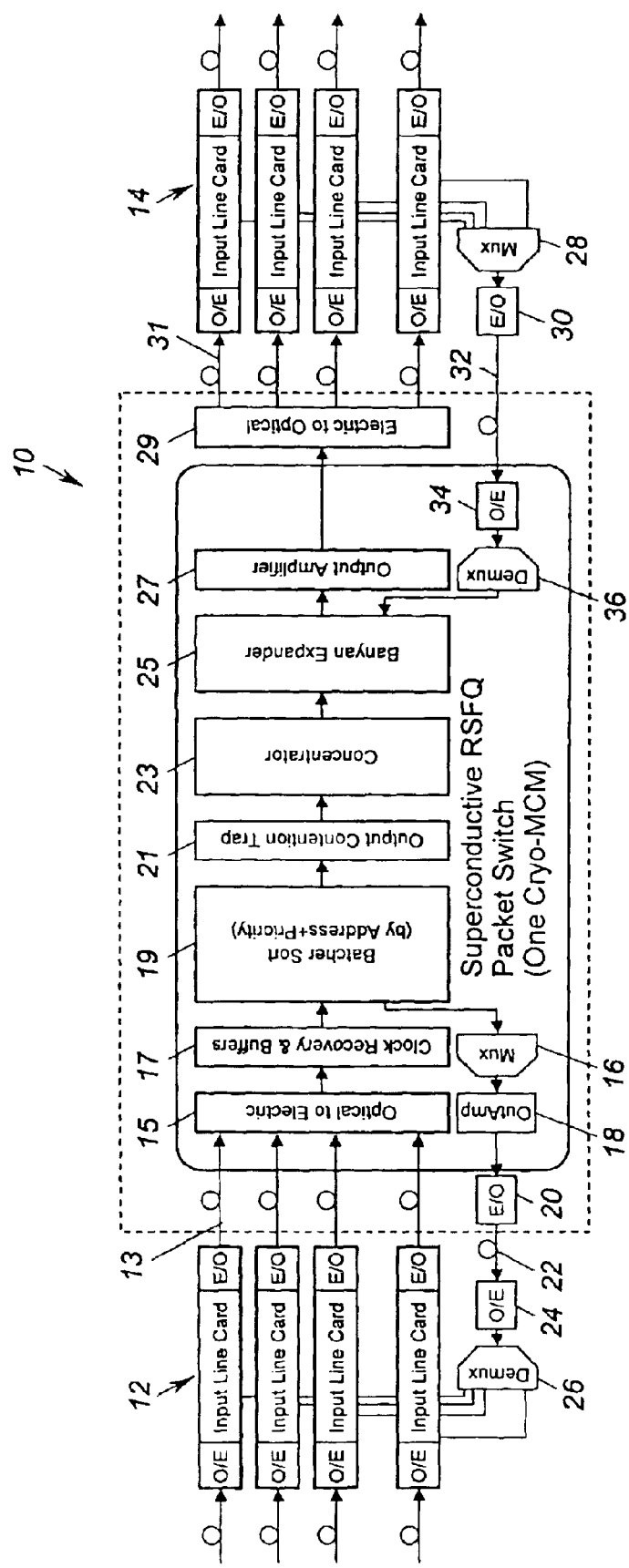
FIG. 3 is block diagram of an NxN network switch architecture that contains the switching core of the present invention.

FIG. 3, to which reference is made, illustrates and embodiment of the NxN network switch architecture, the hardware, which performs the algorithm functionally and illustrated in FIG. 1 and previously described in connection with that figure. The figure includes the switching core 10 that contains the superconductor components. That switching core is located inside the region bounded by dotted line 11, representing the boundaries of a cryo-MCM. During network operation, that region is maintained at a cryogenic temperature, such as the 4.2 degrees Kelvin of liquid helium, as example.

In a specific example of the 512x512 switch system contemplated by the present invention as example, a cell is about 512 bits in length, the address is 9 bits long and the priority is several bits in length. It should be understood that other sections of information may be packed into a cell to serve additional purposes as desired by the system designer. Digital systems that use such cells retain information on when the first bit of a cell is being transmitted or sent, and when transmission of the correct number of bits that constitute a cell being sent has completed. The system also "knows" when one cell ends and the next cell being transmitted begins and contains the means to determine which section of the multi-section cell to read. When the cell is transmitted over a data communication network, the cell is essentially responsible, so to speak, for finding its way through the network to the location of the address, such as was briefly described in connection with FIG. 1.

To make that routing possible the network includes the data routing apparatus that senses or deciphers the address and routes the cell accordingly. More typically, the network address contained in a self-routing cell may differ in format from the destination address format required by the Batcher banyan switching network for routing through that switching network. Thus, the switching network contains ancillary electronics, sometimes referred to as controllers, that remove the network address in each received cell and replace that address with an another address, the switching network address, that the switching network is equipped to understand. Additionally, other controllers that follow the switching network will either replace the switching network address in each cell that is routed through the network with the original network address for the cell, or, if the network switching address was stripped from the data cell during that routing, insert a network address in the cell. The foregoing description is fundamental and well understood by those skilled in the art. The present invention mates the technology of digital networks with that of superconductive devices and emulates the network function previously performed using semiconductors.

In the illustrated architecture, input and output buffering, address resolution and any necessary cell reformatting is performed by semiconductor input and output line cards 12 and 14 that are located external to the cryogenic regions for the switch. Since cell format for the data transmission network is fixed by networking protocols, one function of the input (and output) line cards is to convert the transmission network cell format to the cell format required by the switching network (and vice-versa), while assigning appropriate destination addresses and priority to the cells. The switching core includes a portion of the fiber optic links 13, optical to electrical converters 15, clock (signal) recovery devices and buffers 17, a Batcher sort network 19 to sort cells by address and priority, an output contention trap 21, a concentrator (reverse banyan network) 23, a banyan expander 25, output amplifiers 27, electric to optical converters 29, and output fiber optic links 31.

Switching core 10 also contains a multiplexer 16, output amplifier 18 and electric to optical signal converter 20 that couples via a fiber optic link 22 to components of the NxN network located external to the core, specifically, to an electric to optical converter 24 and demultiplexer 26 combination. That demultiplexer couples outputs to the various input line cards 12. The foregoing circuit is a feedback circuit that informs the respective line card that a cell originating from that card was dropped by trap network 21 as a result of a cell contention.

The NxN network also contains a multiplexer 28 having inputs coupled to the output line cards 14. That multiplexer is coupled to an optical to electric converter 30 and the output of that converter is coupled into the switching core via optical link 32 to an electric to optical converter 34. In turn the output of that converter is input to a demultiplexer 36, the outputs of which connect into the banyan expander network 25. The foregoing circuit provides another feedback circuit through which cells that are dropped due to a cell contention in subsequent portions of the data transmission system, not illustrated, are reported back through the switching core to the line card 12 from which the dropped cell originated. The status of the output line cards 14 may also be reported back through those feedback circuits to the line cards 12, as example, informing of a broken link or a buffer overflow.

In operation, cells arrive to the RSFQ switching core on N optical fiber links 13. After optical to electric conversion 15 and clock (signal) recovery 17, the cells are buffered and aligned (in time) in a set of RSFQ FIFO buffers 17 (FIG. 3) and 39 (presented hereafter in FIG. 4). Each cell consists of $log_2 N$ bits identifying required destination link, a number of priority bits and a number of payload (data) bits, as earlier illustrated in FIG. 2. Both destination address and priority of a cell are sent serially most-significant-bit (MSB) first in the cell. In the NxN network, the cells are first sorted by destination link addresses and priorities using Batcher bit-serial sorter 19. Such a sorter is described in an article by K. Batcher. "Sorting Networks and their Application", *AFIPS Spring Joint Computer Conference Proceedings*, Vol. 32, pp 307–314, 1968.

When multiple cells are destined for the same output link (e.g. contain an identical address) producing a contention, the cell with the highest priority is selected by output contention trap 21, and the lesser priority ones of the contending cells are dropped. When a cell is dropped, the corresponding input line card is informed of that action via the feedback path, formed of elements 16, 18, 20, 22, 24 and 26, from Batcher network 19. The electronics of the line card 12 on the other side of the input link typically contains a copy of the cell, stored in the buffers associated with the line card, so that a dropped cell is not permanently lost. The line card then is able to retrieve the same cell at a subsequent point in time and re-send the cell through the NxN network.

Concentrator 23 separates cells that are full from those that are empty to ensure that the final banyan network is non-blocking in character. As described in an article by Hickey & Marcus, "The Implementation of a High Speed ATM Packet Switch using CMOS VLSI," XIII *International Switching Symposium Proceedings*, Vol 1, pp 75–84, Stockholm, May 1990, the concentrator network can be constructed using a reverse banyan fabric, which differs from the traditional banyan pattern only in wiring pattern, prepended by a simple bit serial running-sum adder network (not illustrated). A running sum adder is schematically illustrated in the foregoing Hickey & Marcus article. Alternatively, another Batcher sorter may be employed as the concentrator network. A reverse Banyan network is much simpler in structure than a Batcher sorter, and for that reason is preferred.

The Banyan expander network 25 distributes selected active cells to their respective destinations (the particular output line cards 14). To do so, the banyan expander network outputs binary digital signals of the cells to respective output amplifiers 27. The cells are then converted to digital binary optical signals by converter 29. From that converter the pulses of light propagate via optical link 31 to the respective addressed output line cards 14 from whence the signals may propagate to other apparatus in the transmission system, not illustrated as such apparatus is not relevant to the present invention.

Figure 4:
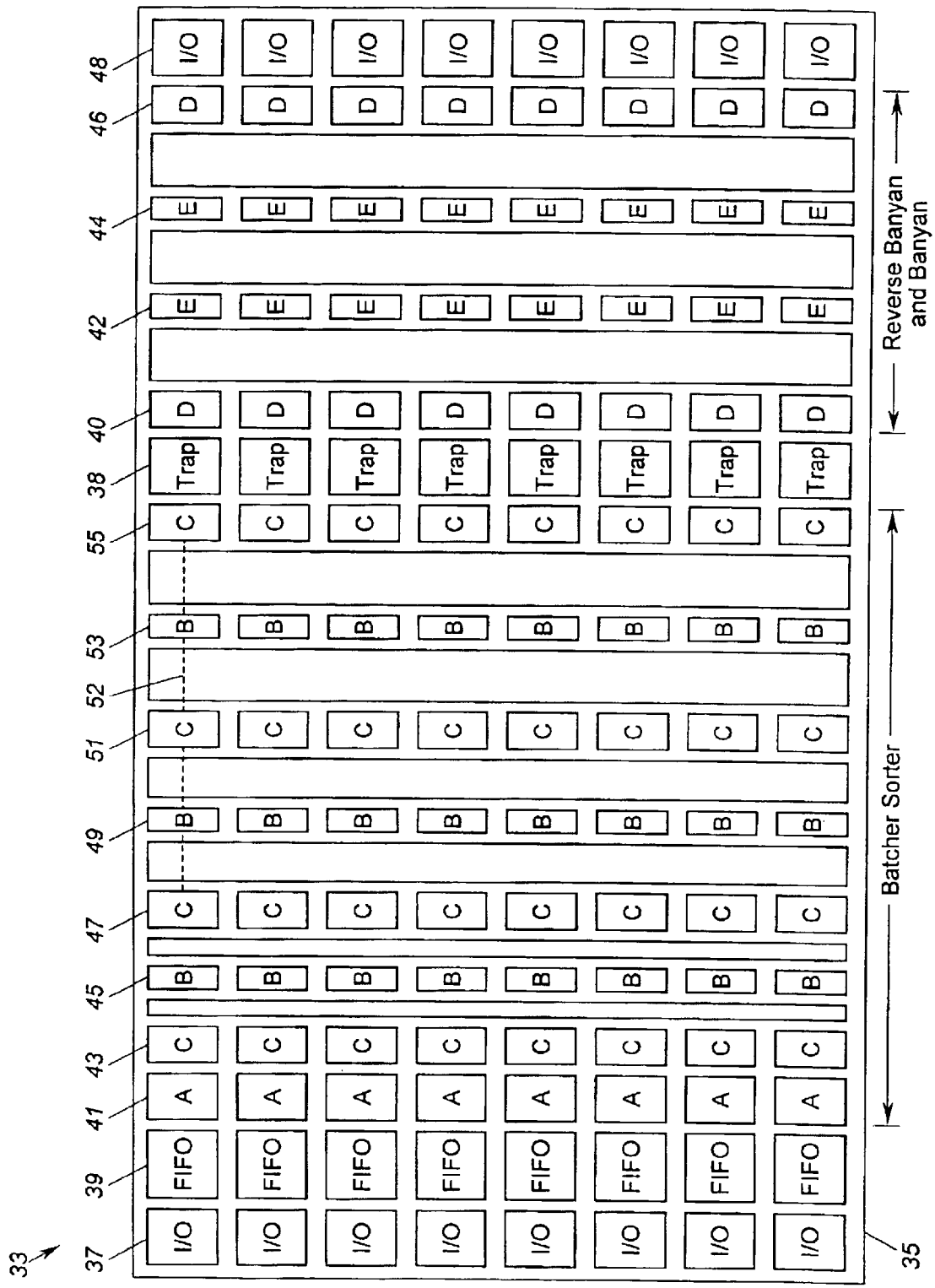
FIG. 4 is a floor plan or layout of an embodiment of a superconductor Batcher Banyan network of the invention as mounted on a passive cryo-Multi-Chip Module substrate.

FIG. 4 is a floor plan of a 512×512 Batcher and banyan switch 33 implemented on a single cryo-multi-chip module ("MCM"), which, in one practical embodiment, is implemented on a single rectangular shaped MCM substrate 35 that is only 8 cm in width by 16 cm in length and 0.25 cm thick. The MCM substrate is a relatively simple structure which may contain two or so wiring levels and one ground plane level. As illustrated, the Batcher banyan network contains a number of different superconductor chips arranged in columns. As known, superconductor chips are fabricated in much the same manner as semiconductor chips, as example by deposition techniques on a silicon wafer, and, hence, are also referred to herein as a chip. From left to right, the chips are designated chip I/O, 37, chip FIFO, 39, chip A, 41, chip C, 43, chip B, 45, chip C, 47, chip B, 49, chip C, 51, chip B 53, chip C, 55, TRAP, 38, chip D, 40, chip E, 42, chip E, 44, chip D 46 and chip I/O, 48. The letters, such as A, represents a particular chip design, such as the topologies that are presented in the succeeding figures that define the type. The column is eight chips in length (e.g. eight rows). Accordingly, each chip in a row handles 64 of the 512 total inputs and/or outputs.

The I/O chips, chips 37 at the front or input end of the switch and chips 48 at the output end thereof, provide the interface between the cryostat temperatures and the room temperature exterior of the cryostat. The FIFO chips are cell buffers/aligners. Chips 41, 43, 45, 47, 49, 51, 53 and 55 together define the circuit of the Batcher sorter (19 FIG. 3).

The TRAP chip 38 implements output collision detection. The chip also incorporates a superconductor running sum adder for the concentrator network, which is a superconductor emulation of the semiconductor version of the running sum adder described in the publication by Hicky & Marcus, earlier cited. Chips 40 and 42 together define the circuit of a reverse banyan network for the concentrator network (23 FIG. 3). The concentrator outputs to the expander (27 FIG. 3) and chips 44 and 46 together define the circuit of a banyan network for the expander.

FIG. 5 illustrates and defines the topology 56, that is, the conductor wiring and Josephson junction switching cell 57A contained in Chip A, such as 41 in FIG. 4, to accomplish the sort function. Each small square block in the figure represents a Josephson junction switching cell, the active element in the circuit, and the remaining lines represent the conductor wiring. Each switching cell contains many Josephson junctions and is a two-bit serial sorter illustrated in FIG. 8, later herein described. The topology illustrated is for a 32-input/output sort. For a 64 input and output sort, which is the preferred embodiment, Chip A contains two such conductor and Josephson Junction topologies.

FIG. 6 illustrates and defines the corresponding topology 58 of a chip B, 45, 49 and 53, that accomplishes the function of an 8-input merge. Since the merge in the present embodiment is to accomplish a 64-input merge, the topology of Chip B contains eight of the illustrated topologies. In other words, 8×8 inputs supplies the necessary sixty-four inputs. In the figure the small square blocks 57 represent the same switching cell element that was described for the block element 57A in FIG. 5. Chip E contains a topology that is identical to that of Chip B. Chip E functions together with chip D to form the Banyan and reverse Banyan networks.

FIG. 7 illustrates and defines the topology 61 of Chip C, 42, 47 and 55, which functions to provide a 64-input merge. As in the other topologies the small blocks 57 represent Josephson Junctions and the remaining lines represent the conductive wiring. Chip D is identical in topology to Chip C. The small square blocks 57 in the topology of chip D represent two-bit serial sorters that are essentially the same as the sorter illustrated in FIG. 8, but with a slight modification. The modification is later herein described following the description of the sorter of FIG. 8 and the trap of FIG. 9.

The foregoing chips of FIGS. 5–7 are fastened to the appropriate conductor pattern and input and output leads that are formed on the surface of the MCM substrate. At present for a practical chip to substrate interface, such fastening preferably may incorporate the flip-chip bump transitions described in the U.S. application for patent of Michael S. Wire & Quentin P. Herr, entitled Transmission Line Single Flux Quantum Chip-to-Chip Communication with Flip-Chip Bump Transitions, Ser. No. 09/935,037, filed Aug. 22, 2001, assigned to the assignee of the present invention, which is incorporated. The foregoing also enables chip-to-chip communication found in the present invention which the foregoing fastening technique makes possible.

Reference is again made to the layout of FIG. 5. The chips and circuit components in each row are connected via appropriate wiring, the interconnect wiring, on the MCM substrate 35. That interconnect wiring is only partially illustrated in the figure by dotted lines 52 extending between chips by the dotted line between chips 47 and 49, that between chips 49 and 51, that between chips 51 and 53, and that between chips 53 and 55. Interconnect wiring also extends between other adjacent chips in the rows of chips, but is not illustrated. In the specific embodiment of a 512×512 network presented, and as seen from the quantity of electrical leads or wires at the input and output ends of the topologies of FIGS. 5–7, the wiring density is very great. Typically, the width of the leads in FIGS. 5–7 for the specific embodiment are about five microns in width, and matches the width of the interconnect wiring on substrate 35, also five microns, for an appropriate impedance match. Interconnect wiring 52 connects between 37 and 39, other interconnect wiring is found 39 and 41, and so on between each adjacent chip or component in each row, through to the wiring at the output end of I/O 48. The interconnect wiring is preferably formed by stripline, not illustrated, and enables what is referred to as SFQ chip-to-chip communication. The unmarked areas in FIG. 4, such as 52, represent wiring channels.

As an additional practical assist, the SFQ chip to chip communication used may also take advantage of double flux quantum pulses, employing the invention described in the U.S. application of Quentin P. Herr, entitled Double Flux Quantum Superconductor Driver, Ser. No. 09/934,493, filed Aug. 22, 2001, assigned to the present assignee, which is incorporated herein by reference.

As those skilled in the art appreciate, the foregoing practical layout incorporates the discovery that it is possible to parse the Batcher sort network amongst three superconductor chips, chips A, B and C, to integrate a Batcher sort network on a small size substrate and to include therewith other chips defining the banyan network. As one appreciates, all global signals, such as clock pulses, are assumed to reach the various circuits at proper points in time. The design should ensure that all delays are balanced, such as by including distribution tree circuits in lower layers of the substrate or circuit board, not illustrated, or incorporate other means of clock recovery. Considerations for the First in-First-out buffering 39, including clock recovery are adequately described in the conference paper by Q. P. Herr & P. Bunyk, "Implementation and Application of First-In First-Out Buffers, presented Aug. 4, 2002 at the *Applied Superconductivity Conference of the IEEE*, Houston Tex. (and soon to be published in IEEE Transactions on Magnetics).

Figure 8:
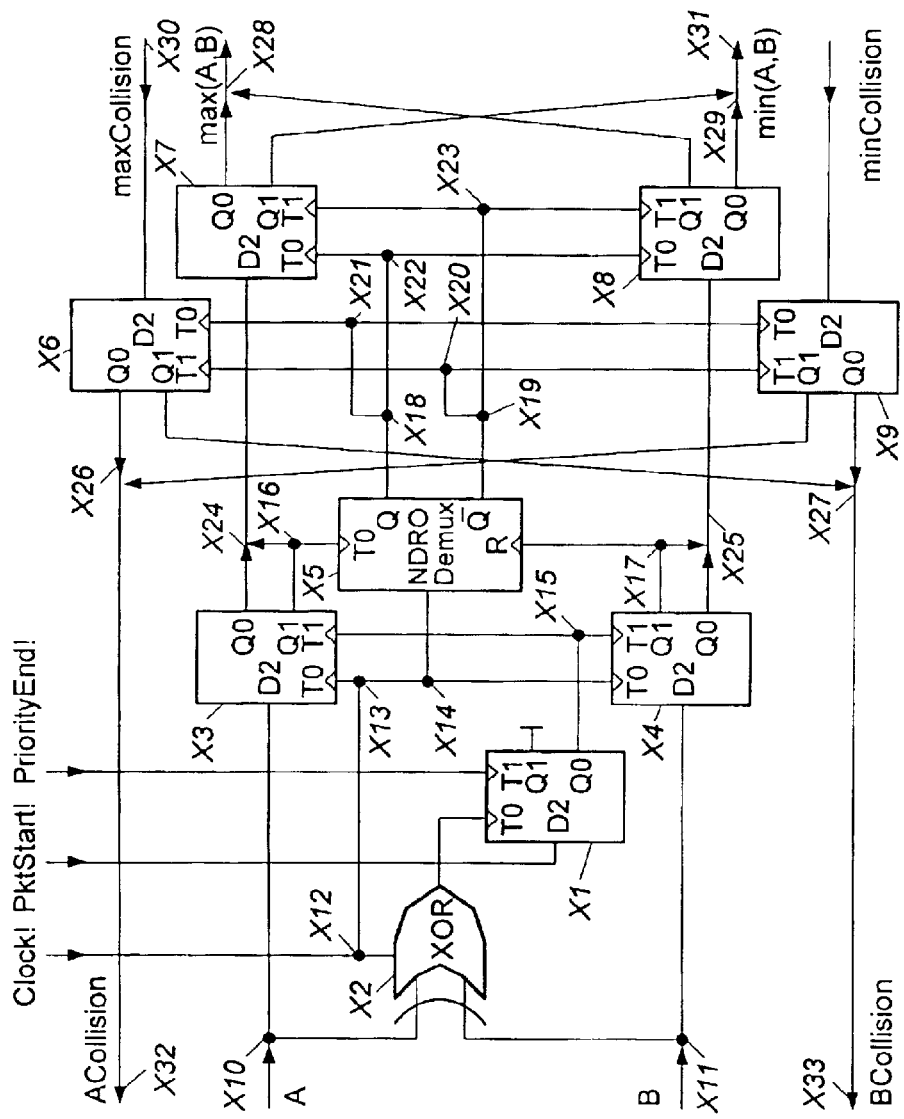
FIG. 8 is an embodiment of a novel SFQ two-bit serial sorter, constructed in accordance with another aspect of the invention, that is used within the network embodiments of FIGS. 3 and 4.

In accordance with the invention, both the fabrics of the Batcher and banyan networks share some advantageous features. The basic switching element is a simple 2×2 switch that accepts two-bit serial words as input and sends them to two outputs. That switching element is an ancillary invention, the preferred embodiment of the Batcher sorter switch, which is illustrated in FIG. 8 and is later herein described. All wiring is one-to-one; no broadcasting is ever performed. The wiring patterns are complex, but regular. Both networks possess logarithmic complexity: For the Batcher network there are: ½ $\log_2 N$ (1+$\log_2 N$) columns and N/2 rows and for the banyan network there are $\log_2 N$ columns and N/2 rows. Both networks have recursive structures. A large N×N network can be decomposed into smaller size elements: For the Batcher network, given K×K elements a $K^2 \times K^2$ fabric can be constructed with 1+2 $\log_2 K$ columns and N/K=K2/K=K rows. For the banyan network there can be $\log_K N = \log_2 N / \log_2 K$ columns and N/K rows of K×K elements.

Figure 9:
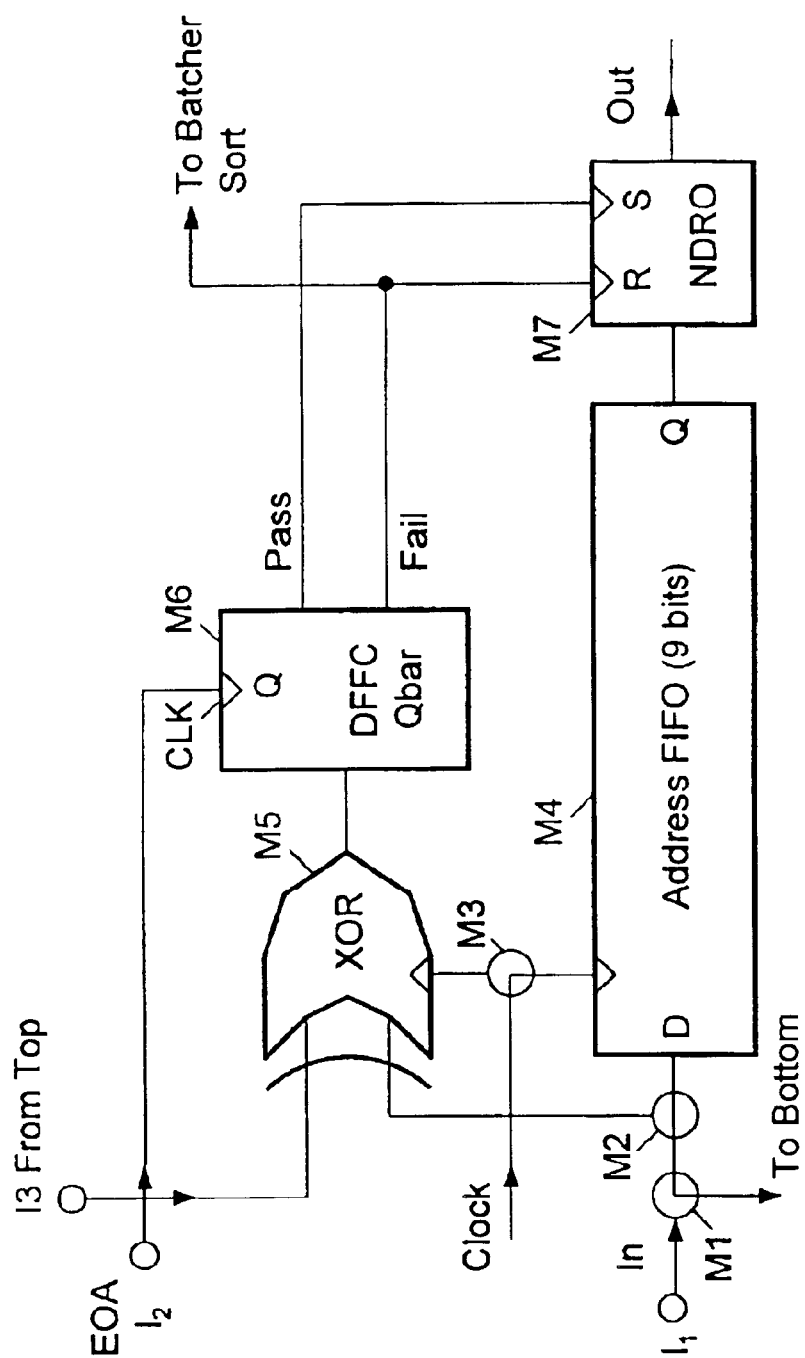
FIG. 9 is an embodiment of a novel SFQ trap circuit, constructed in accordance with still another aspect of the invention, that is also used within the network embodiments of FIGS. 3 and 4.

As one appreciates the logic symbols for flip-flops and other gates referred to in this specification that are depicted in FIGS. 8 and 9 that follow are typically equated with semiconductor circuits. However, as recognized by those skilled in the field of superconductor circuits, the flip flops and other active circuit devices described herein are constructed of superconductor devices in which Josephson Junctions comprise the active circuit element and generate and/or regenerate single flux quantum ("SFQ") pulses during operation. Customarily those devices are referred to as SFQ devices and for convenience those superconductor logic devices are referred to as SFQ devices, such as the SFQ D2 flip-flops, SFQ XOR gate, SFQ NDRO demux and the like later herein described. Thus, it should be understood that when a particular logic element, such as a flip-flop, gate or the like is referred to in this specification and in the claims that follow but does not expressly include the SFQ designation, the logic element should be understood to be and is intended to be interpreted as one that implicitly includes the SFQ designation, unless expressly stated to the contrary or unless the context in which the term is used does not permit such implication.

Before reviewing the novel circuits of FIGS. 8 and 9 in detail, it may also be helpful to review the descriptions of the functional characteristics of the SFQ logic gates that appear in those circuits. Those characteristics and possible schematics of those gates are presented in a Definitions section appearing at the end of this specification.

THE TWO-BIT SERIAL SORTER. FIG. 8 illustrates a 2×2 Batcher bit-serial sorter constructed in accordance with the invention. That sorter contains inputs to receive cells, labeled A and B, inputs for global signals from elsewhere in the system, including clock input (Clock!), cell or packet start input (PktStart!) and priority end input, PriorityEnd!, signifying completion of that the portion of the cell dedicated to the priority code, outputs MAX (A, B) and MIN (A,B), and various SFQ logic components, including exclusive OR gate (XOR) X2, type D2 flip-flops X1, X3, X4, X6, X7, X8 and X9, an NDRO demux, X5, pulse splitters X10, X11, X12, X13, X14, X15, X16, X17, X18, X19, X20, X21, $X_{22}$ and X23, pulse mergers X24, X25, X26, X27, $X_{28}$ and X29 connected as shown in the figure. Additionally a max Collision X30 and minCollision input X31 are connected, respectively, to data inputs of flip-flops X6 and X9. The latter defines the return paths for cells that are dropped by subsequent stages in the transmission system, not illustrated, and are to be returned via the sorter of the figure to the line card from which the data cell originated. The sorter contains an Acollision output X32 and a Bcollision output X33.

The function of the foregoing 2×2 Batcher bit-serial sorter is to accept two bit-streams (or cells applied to respective inputs, A and B), each bit-stream being presented with the most significant bit first in (time or position) in the data stream, determine which bit stream is represents the larger binary number (i.e. which MSB is largest) and copy the bit streams to the two outputs, MAX and MIN; copying the bit stream that defines the numerically smaller number to the MiN output and copying the bit stream that defines the larger digital number to the MAX output. When a PktStart! (e.g. cell start) pulse arrives from an external source in the system, not illustrated, the pulse is stored in a D2 flip-flop, X1. The two bit streams (e.g. cells) are applied at the A and B inputs, are compared by an XOR (exclusive OR) gate, X2, and, after a slight delay, are also copied to the MAX and MIN outputs. If the digital numbers defined by the bit streams are identical, then it doesn't matter which bit stream is copied to which output.

When the first mismatch between the cells applied to inputs A and B occurs, XOR X2 detects the mismatch and outputs a pulse to the T0 input of D2 latch X1, which is the read input to the latch. The SFQ pulse earlier stored in that latch is then outputted from latch X1 output Q0. Subsequent mismatches occurring at inputs A and B of the sorter are ignored until another PktStart! pulse is again applied to latch X1.

The network system supplies various global signal pulses, including clock pulses, Clock!, packet start pulse, PktStart!, and priority end pulse, PriorityEnd!. As earlier described, the inputs applied to inputs A and B are the cells or data packets shown in FIG. 2, constituting a serial bit stream (formed of digital "1"'s and "0"s) containing sections representing particular information. The first section of the cell constitutes the data bit stream representing the output link address of the packet; the second section constitutes the data bit stream, representing the priority assigned to the data, and the third or payload section of the data bit stream, contains the data being propagated. As established by the system design, each data packet is a predefined number of bits overall and the number of data bits or bit positions in each section is also prescribed. The digital information in each section is arranged with the MSB first. To start the operation, a packet start pulse is applied initially to the data input of SFQ D2 flip-flop X1.

The first bit (either a 1 or 0) in the address section of each packet is applied to the respective A and B inputs of the sorter. The bit at input A is split at splitter X10 and is applied to the data input of SFQ D2 flip flop X3 and one input of XOR X2; and any bit from input B is split at splitter X11 and applied to SFQ flip-flop X4 and to the other input of XOR X2. The XOR compares the two bits and, when a clock pulse is applied to the clock input, provides an output to the T0 input of X1 that indicates whether the two inputs were the same or different. If the bits are identical, the XOR outputs a "0", that is nothing, the absence of a SFQ pulse; if different a "1", a single SFQ pulse. A clock pulse (Clock!) is received concurrently with each bit position in the received data packets. The clock pulse is split by splitter X12 and is applied, for one, to the clock input of the SFQ XOR. Assume that both bits of the cell being received are identical, then XOR gate X2 outputs a "0" to input T0 of flip-flop X1.

The clock pulse is also applied to the T0 inputs of SFQ flip-flop X3 and X4 via splitters X13 and X14 and to the input of NDRO demux X5. Flip-flops X3 and X4 each store the respective digital bit of the cells that were input at inputs A and B and later outputs that bit, whether a 1 or a 0, at respective outputs Q0 when a clock pulse is input to the T0 input of the respective flip-flops. If, however, a pulse is applied at input T1 of the respective flip-flops, the stored pulse is instead output at output Q1.

The NDRO demux possesses an S input or set input and an R or reset input. The demux is non-destructive. Assume that when last initiated the demux was placed in a state in which the output of the demux is a "1" at Q and a "0" at Q-bar. The clock pulse initiates the demux output. Since neither flip-flop X3 or X4 is producing an output to the respective S and R inputs of the demux, the demux remains in the same state following input of the clock pulse to that demux. Those demux outputs are applied to the respective T0 inputs of SFQ flip-flops X7 and X8 via splitters X18 and X22, respectively. Meanwhile, the Q-bar output of the demux remains a "0". The pulse at those T0 inputs causes the respective SFQ flip-flops X7 and X8 to output the stored pulse to the respective Q0 outputs. Thus, the "0" bit from input A propagates to the MAX output of the sorter and that from input B to the MIN output of the sorter. Since the two digital bits are the same, it makes no difference which sorter output receives the digital bits.

The same action occurs if the next bit applied by the respective data packets at inputs A and B is a digital "1". The XOR gate does not detect any difference between the two signals, and the bits progress to the same MAX and MIN outputs of the sorter as before.

Case: BIT at input A>than at input B. Next assume that the next most significant bit of the address section of the packet at input A is a digital "1" while that applied by the second packet at input B is a "0". Hence, the address of the data packet is a higher address; and the data packet from input A should be routed to the MAX sorter output.

The digital "1" on input A is split at splitter X10 and applied to the data input of flip-flop X3 and to one of the inputs of XOR X2, while the digital "0" at input B is split at splitter X11 and applied to the data input of flip-flop X4 and the other input of XOR X2. With different digital bits, a "1" and a "0" present at respective inputs of XOR X2, the gate is prepared to output a digital "1". On arrival of the next clock pulse to the clock input of the gate the exclusive OR gate applies the digital "1" pulse to the T0 input of SFQ D2 flip-flop X1. In turn flip-flop X1 outputs the stored "1" bit (earlier supplied by the packet start pulse that was latched in the flip-flop) to the Q0 output. That "1" bit is split by splitter X15 and is applied to the T1 inputs of both SFQ D2 flip-flops X3 and X4. That action pre-empts the clock input at the T0 inputs, which arrives later in time.

Referring back to X3 and X4, the respective "I" and "0" pulses applied to the respective data inputs are stored in the respective flip-flops. On receipt of the pulse from flip-flop X1 at the T1 inputs, flip-flop X3 outputs a high, that is "1" pulse from the Q1 output. That output pulse is split by splitter X16 and concurrently applied to the data input of flip-flop X7, which stores the pulse, and the Set input S of SFQ NDRO demux X5. After the Set pulse, the NDRO demux is brought into the operational state in which all subsequent clock pulses received at the demux input are sent to demux output Q.

Reference is again made to flip-flop X4. On receipt of the pulse from X1 at the T1 inputs, flip-flop X4 outputs a low, that is "0" from the Q1 output. As a result the output of splitter X17 is a "0" and that low is concurrently applied to the both the data input of flip-flop X9, which stores a "0", and the Reset input R of SFQ NDRO demux X5. When the "1" pulse from flip-flop X1 (via splitter X15) was applied to the T1 input thereof, the data bit from the cell at input B that was stored is a digital "0". The flip-flop outputs that digital "0". As earlier noted the low or "0" is not technically a pulse. Since the output of the flip flop is a "0", the output of splitter X17 is also a "0" and that low is applied thereby to the reset input R of the demux and, concurrently, to merger X25, which also outputs a low. Since the demux requires a "1" pulse to the R input to cause a reset, the "0" outputted by flip-flop X4 is of no effect on the demux. From the output of merger X25, the "0" is applied to the data input of SFQ flip-flop X8, where the low is stored for further action, later described herein.

At this stage, a "1" is stored in flip-flop X7 and a "0" is stored in flip-flop X8. It may be noted that the transfer of SFQ pulses from X3 to X7 and from X4 to X8 could possibly occur more quickly than the time required to set of demux X5, which could result in a failure of operation. To ensure that such mistiming does not occur, some time delay may be added to the transmission path between X3 and X7, and between X4 and X8 to strike a balance in the timing and ensure the desired mode of operation.

The output from Q of X5 is applied to the T0 input of FLIP-FLOP X7 and to the T0 input of FLIP-FLOP X8. Accordingly, X7 outputs the stored "1" pulse from Q0, which goes to the MAX output; and X8 outputs the stored "0" pulse (bit) from the Q0 output which outputs to the MIN output.

Case: BIT at input B> than that at input A. If the data bit being evaluated by the routing circuit at B was a "1" (meaning that the address of the data cell at B is larger) and the data bit at A was a zero, by following through the foregoing description one finds that the demux X5 will be reset, and, hence, the "1" output will be outputted from output Q bar (instead of output Q); that flip-flops X7 and X9 receive a "1" pulse at the respective T1 inputs thereof; that a "0" stored in flip-flop X7 outputs from output Q1 of that flip-flop and propagates through merger X29, to output MIN; and that a "1" stored in flip-flop X8 is output from Q1 of the flip-flop and propagates through merger X28 to the MAX output. Thus, the setting of the state of demux X5, sets the particular output, MAX or MIN, to which the separate data cells are routed, and that state is set so the higher address (or higher priority) always proceeds to the MAX output.

Case: Cell address at A is the same of address at B. In the foregoing manner, the sorter inspected each bit of the cell address until the sorter is able to determine which cell contains the higher address. If, however, the address section of the data cell applied at A is the same as that cell applied at B, the sorter won't make any routing decision at that time, and the action will continue as described earlier for the case where the bits at both inputs were either "1" or "0". The next section of the cells are presented to the sorter and that section contains the digital bits assigned to the Priority section of the data cell. The operation of the circuit remains the same as before. Once the sorter determines that the BIT of one of the two cells is greater than the other, the decision is made and the larger of the two is routed to the MAX output, and the smaller to the MIN output.

Case: Both address and Priority of cells at A and B are identical When the bits in the priority section of the two cells are identical, the outputs from flip-flops X7 and X8 are identical, and the contention is resolved. Which cell is routed and which is dropped depends on the previous state of the network hardware earlier described. By that hardware, the cell that is selected to pass depends on routing decisions made during the previous routing cycle and, effectively, is almost random, guaranteeing a sort of fairness amongst contending cells in resolving contention. The network maintains a count of the bits that proceeded through the sorter and is able to detect that the last bit in the priority section of the cell was inputted. On that detection, the network sends a priority end pulse, PriorityEnd!. That pulse is input to the T1 input of SFQ D2 flip-flop X1. In response the "1" pulse stored in X1 (earlier supplied by the PktStart! pulse, earlier described) is outputted from output Q1 to ground. Even though pulses are thereafter applied by gate XOR X2 to the T0 input of X1, the only bit stored in X1 is a "0", but, as earlier described, that "0" has no effect at the T1 inputs of the succeeding flip flops, X3 and X4.

Since flip-flop X1 is empty at this stage, even though the digital bits of the actual data (e.g. the payload information) in the third section of the cell is progressing through inputs A and B and are undoubtedly different from one another, the decisional logic of the sorter is effectively disabled by the priority end pulse that emptied flop-flop X1. Thus, only the address and priority bits in the cell may be used as the basis of the routing decision by the sorter; not the actual informational data in the cell. The SFQ flip-flop X1 does not become operative again until another cell start pulse arrives at input PktStart! to supply a "1" pulse to store in flip-flop X1. That action provides a degree of fairness in cell routing. A cell with many "0"s in the data portion of the cell will not thereby be placed at a disadvantage.

Case: Post routing decision action of the sorter. SFQ D2 flip-flop X1 received and stored the Packet Start pulse "1" and the flip-flop outputted that pulse at the time XOR X2 determined that the MSB of the address (or priority) of one of two data cells differed. Emptied of that pulse, further outputs from the XOR will always be "0" and thus have no effect on flip-flop X1. Hence, evaluation of subsequent data bits in the inputted cells is not possible, until another packet start pulse is received at the data input of flip-flop X1. That packet start signal is only supplied when the system requires an evaluation of another pair of data cells and supplies that pulse PktStart!. Thus, once the routing decision is made, there's no need to inspect any succeeding digital bits in the serial data stream, allowing the remainder of the two data cells to proceed through the sorter to the respective MAX and MIN sorter outputs. It is noted so long as an SFQ pulse is stored in flip flop X1, the flip-flop ignores any additional SFQ pulses that may be presented to the input of the flip-flop.

Case: Backflow of Rejected Cells. The sorter also provides the means for data cells that are rejected by a subsequent stage in the network, not illustrated, to be returned back to the originating source as in the case where two cells contend for the same address (or system line) and the lower priority data cell is rejected. The fact that the cell was rejected is preferably returned to the originating source for further handling or for indication of a failed transmission attempt. To serve that function, the sorter contains inputs maxCollision and minCollision, outputs Acollision and Bcollision, SFQ D2 flip-flops X6 and X9 and the additional wiring connections illustrated in the figure.

The information about a rejected cell should be routed back to the source of the A or B inputs from which the cell originated. Since the state of demux X5 was set when the cell was sent from the sorter output and at this juncture remains in that same state, the sorter is fixed to propagate the information about cell rejection to the appropriate one of the A or B inputs. Assuming that the state of the demux is in the Q output, then the cell from input A is routed to the MAX output. Hence, information about cell rejection originally issued from that output of the sorter is returned at input maxCollision, the output of flip flop X6 is directed to output Acollision. Each clock pulse received by the demux X5 (via splitters X12, X13 and X14) is output from output Q of the demux. That demux output is input to T0 of flip flop X6, which outputs the received bits of the returned cell to output Q0 of the flip-flop. That output propagates through merger 26 to output Acollision. Similarly, information about a rejected cell that was originally routed to the MIN output should be returned to output Bcollision. Hence, the output of flip flop X9 is propagated through merger X27 to output Bcollision.

If on the other hand, the rejected cell originated at input B and was originally routed to output MAX of the sorter, the state of demux X5 is set to output from output Q bar. The output pulses from Q bar are applied to the respective T1 inputs of flip flops X6 and X9 (via splitters X19 and X20). The data bits received at the T1 data input of flip flop X6 are then output from the Q1 output of the flip-flop and crosses over to output via merger X27 at Bcollision X33. Thus the information about the rejected cell is returned to the source of the original input. In like manner information about a rejected cell at input mincollision is routed by flip flop X9 via output Q1 and merger X26 to output at Acollision X32 back to the source in the preceding part of the network, not illustrated, from which the rejected cell originated. The foregoing routing of information about rejected cells is seen to occur simultaneously with the routing of cells inputted to the sorter at A and B. Operation in the forward direction does not interfere with the operation in the reverse direction.

OUTPUT CONTENTION DETECTOR (OR TRAP). Once the Batcher sorting network has sorted the cells by address and priority, from highest to lowest MSB, it is possible to detect for any output contentions between cells. That detection is accomplished by comparing the address portions of the cells in adjacent rows of the sorter outputs. Because of the sort, two cells that have the same output address are located in adjacent rows of the network. The upper or top cell, which by definition has the highest priority of the two cells in the adjacent rows, is permitted to pass through the network, the lower priority contending cell should (and is) effectively trapped and "discarded". The electronic trap for an N×N network requires N−1 individual trap "slices". Each slice is formed of an electronic circuit that compares the address portion of the cell in one row with the address portion of the cell residing in the next adjacent lower row and, should the comparison show that an address contention exists, prevent the cell residing in the lower row from being outputted.

An individual slice of the network trap is illustrated in FIG. 9 to which reference is made. The slice includes three SFQ splitters M1, M2 and M3, an SFQ shift register M4, referred to as a FIFO device, an exclusive OR gate M5, a D Flip-Flop with Complimentary outputs ("DFFC" latch) M6 and a Non-Destructive Read-Out (NDRO) flip-flop, M7 that are electrically wired together as illustrated. All the foregoing components are known SFQ superconductor devices. Shift register M4 functions as a delay "first-in first out" ("FIFO") device and is of a size that holds, that is, contains enough stages to hold, sufficient digital bits for the particular network switch employed in the system. As example, in a 512×512 bit switch, the shift register must be capable of holding 9 bits, the number of bits in the cell address. The trap circuit or trap contains four inputs and an output. Input I1 is connected to the cell data line and that gizmo provides the serial bits of the address from the lower one of the two rows of the batcher sorter. Input I3 connects to the line of the cell immediately above, the output of the Batcher sorter, which provides the serial bits of the address contained in the upper one of the two rows of that sorter. Input I2 serves as the clock input and is connected to the system clock, which provides a clock pulse concurrently with each bit of the cell address. Input I4 receives the digital bit that represents the end-of-address, that is, that the transmission of the cell address has concluded.

In operation, the serial stream of digital bits of the address of the cell entered into the upper row of the sorter is fed into input I3 and to one of the two inputs of exclusive OR gate M5. Concurrently therewith, the serial stream of digital bits of the address of the cell being entered into the lower row of the sorter is fed into Input I1, and thence is split, at splitter M1 and then again at splitter M2 and applied to the second input of that exclusive OR gate M5. Each bit of the serial stream is "clocked" in by clock pulses from elsewhere in the network, and those clock pulses are applied simultaneously to Input I2, are split by splitter M3 and those split parts of the clock pulse are applied, respectively, to the clock input of exclusive OR M5 and to the clock input of shift register M4.

The portion of the digital bit at splitter M2, representing a bit of a cell address, is inputted to shift register M4, a FIFO device. That digital bit is clocked into the shift register and stored upon application of the clock pulse to the clock input of the FIFO device. As successive digital bits of the address are presented at the D input of shift register M4 (and accompanying clock pulses at splitter M3), each digital bit earlier stored in the shift register advances in position toward the output stage of the register. That process continues until all the digital bits, representing the address of the cell in the second row, are stored in the shift register. By design, when all the digital bits of the serial digital stream representing the cell address have been inputted, the most significant bit of that address is stored in the final stage of the shift register and the least significant bit of that address is stored in the initial stage. In the example given, the address is constituted of nine bits, which are thus stored in shift register M4. Additional clock pulses applied thereafter to the shift register result in outputting those pulses in the order serially stored in the register, that is, first in-first out (FIFO).

Referring again to Input I1, the portion of the serial data stream representing the cell address of the second row of the Batcher sorter that is split by splitter M1 propagates over a lead to the "top" address input of the next trap slice in the trap system. Each such trap slice is identical in structure to the slice presented in the figure. In that way the packet or cell addresses for each row of the sorter is compared by a trap slice against the cell address of the cell in the next lower row.

Returning to the operation of XOR M5, the two address "data streams" received at the two inputs are compared by the XOR on a bit by bit basis. In the event a mismatch occurs between the compared data bits, representing a difference in address, the XOR produces and outputs an SFQ pulse. That SFQ pulse is applied to the DFFC latch M6, which receives and stores the pulse. Although XOR M5 may subsequently detect mismatches as may thereafter occur between lesser significant bits of the one cell address and the second cell address and again produce an output on occurrence of a mismatch (continuing until the transmission of the cell address is completed, e.g. the nine bits in the example given), those additional output pulses have no effect on the DFFC latch, and are effectively ignored.

As recalled, once latch M6 is set by a digital "1", the latch ignores further pulses. The latch may be reset only by application of a "1" pulse to the clock input, CLK. If the latch is in state "1" (i.e. is storing an SFQ pulse) and a pulse is received at the clock input of that latch, the gate then produces an output at Q, which represents "pass". If instead the gate is in state "0" (i.e. is not storing an SFQ pulse when the clock pulse is received), then the gate produces an output at Qbar, which represents "fail". In either event, the pulse applied to the clock input, CLK, also causes the latch to reset to the "0" state.

In the foregoing trap circuit, the pulse applied to clock input, CLK, of the DFFC latch is the End of Address signal or pulse, a global signal sent by the control of the network. When an End of Address pulse is received at input I2, the pulse is applied to the clock input of DFFC latch M6, and thereby "reads-out" the state of the latch. If a mismatch had been detected by the XOR M5, the DFFC latch M6 would have been placed in the "1" state by the output of the XOR; and the latch then produces a "1" output at Q when the End of Address signal is applied. That output is applied to the S input of NDRO flip flop M7.

The output at Q represents a "pass", meaning that the addresses of the two cells being compared are different and no address contention exists, which is the typical case. If, however, the two addresses matched, then XOR M5 did not produce a "1" output; and DFFC latch M6 would have remained in its initial state, which is the "0" state. In that event, the application of the End of Address pulse to the DFFC latch would produce a "1" output at Qbar, and that output in turn is coupled to the R input of NDRO M7. The "1" output at Qbar represents "fail", the presence of an address contention.

The non-destructive read-out (NDRO) latch, M7, is a latch that can be placed in either the "1" state or "0" state by pulses respectively arriving on the Set ("S") and Reset ("R") inputs of the device. If the NDRO is in state "1", pulses arriving on the read-out input are permitted to pass through the gate and appear on the latch output. If in the "0" state, all read-out pulses are ignored; the pulses are not permitted to pass through the gate. Unlike other SFQ latches earlier described, the latch does not reset to an original state when a read-out pulse is applied and the latch is read out. The latch thereby remains in the state in which set by the most recent pulse at the Set or Reset input.

Assuming NDRO latch M7 was set, then when additional clock pulses are applied to shift register M4, the address stored in the shift register is serially outputted to the NDRO latch and passes through (e.g. is output from) that latch. The latch constitutes the output of the trap slice. Not only is the address shifted out of shift register M4 with each additional clock pulse applied to the input of the shift register, but additional bits of the data cell, such as the priority bits and the digital data or payload, are also entered into the shift register with each clock pulse. Ultimately, those bits are clocked through shift register M4 and pass through the NDRO gate M7 to the next stage of the network. As one appreciates, the foregoing process produces a slight delay (e.g. a delay equal to the nine clock pulses for a nine bit address) in producing output from NDRO latch M7. To ensure that the data bit in the top most row of the network is also delayed a like amount, suitably by including a like FIFO circuit to delay transmission of the nine address bits from that row to maintain bit transmission from that row in phase with all the other rows.

If the two cell addresses being compared are the same, NDRO gate M7 remains closed; the data cell from the lower row of the two rows of the Batcher sorter being monitored, which by definition is of a lower priority than the other data cell, is dropped, and a contention signal, taken from the Fail output of latch M6, is returned to the Batcher sorter network. Information of that contention signal eventually finds its way back to the input line card through the Batcher sorter, as earlier described.

As one appreciates since the bit sorter of FIG. 8 continues the comparing operation until the priority end signal is received, the sorter is capable of supporting priority bits that may be arbitrary in length, 1, 2, 3, 4, . . . N places in length. Thus, if an output contention occurs, the highest priority cell will always get through the system.

More specifically, during the cell transfer time through the bit serial sorter the reverse path from destination link to the sending input is established. That path allows sending of information about contention signals, output link condition and destination line status (e.g. buffer utilization) back to the input. Each of those signals may be time multiplex and require only a single bit. As example, when the contention bit is returned to the line card that issued the cell that was dropped by the trap, the card which is holding a copy of the issued cell, knows to reissue the cell. Likewise, when an output link fails, preventing the sending of a cell from the network, the failure bit is received by the line card at a different time slot. Again, the line card knows to reissue the cell. And when the output buffers are overloaded, the output buffers are able to issue an overload condition bit in a still different time slot relative to the clock pulse. That overload condition bit that is received by the line card, and essentially tells the line card not to send any thing else until presentation of the overload condition bit ceases. The line card knows to hold all further transmissions for the duration of the overload.

MODIFIED TWO-BIT SERIAL SORTER. Earlier in connection with the discussion of the reverse Banyan sorter and the topologies of chip D in FIG. 7 and chip E in FIG. 6 the designation of the small rectangular block 57B in the topology represented a two-bit serial sorter similar to that presented in FIG. 8. For that sorter, the circuit of FIG. 8 is modified as follows: The pulse merger 24 is deleted and the Q0 output of X3 is connected directly to the D2 input of X7. The pulse splitter X16 is deleted and the Q1 output of X3 is connected directly to the S input of NDRO demux X5. The pulse merger X25 is deleted and the Q0 output of X4 is connected directly to the D2 input of X8. Finally, pulse splitter X17 is deleted and the Q1 output of X4 is connected directly to the R input of NDRO demux X5.

The Banyan network node takes two bit serial inputs and sends them to the two outputs, deciding which input goes with which of the two outputs. To make that decision, a banyan node in a column, say column "I", looks at the "ith" bit of the destination address in the bit serial stream of the cell, earlier described. As recalled, in the specific embodiment, the cell is formatted with the address section at the beginning of the serial bit stream that constitutes the cell, the address bits are arranged in MSB, and, in a specific embodiment, is nine bits in length. Hence, the routing decisions made by the Banyan network require nine columns. The result of the foregoing changes is that the circuit routes the cell, but drops the bit (of the address) used to make the decision of which circuit output to send that cell.

Due to the operation of the Batcher sorter and the trap in the network, the bits inputted to the Banyan node are guaranteed to be different. So the inputted cell that contains a "1" goes to the top or upper output of the Banyan node, and the cell with the "0" goes to the bottom or lower output of that node. In order to have all of the nodes in the Banyan network be of the same structure, which is preferred, then each node should strip off the address bit which the node used to make the foregoing decision of which outputs to route the respective cells. Subsequent nodes in the Banyan network are not required to know their respective column number, but just wait until the address bits from the data cells at the two inputs of the node differ, then make the cell routing decision and send all subsequent bits from the two input cells to the corresponding outputs.

The key difference from the operation of the Batcher node is that the first bit which differs (and on which the routing decision is made) does not propagate to any output. That bit is stripped off by the modified two-bit serial router, and both outputs get a "0" in that clock cycle. The foregoing is accomplished by the same structure illustrated in FIG. 8 modified to eliminate X16, X24 and X17 and X25), as described in a preceding paragraph.

DEFINITIONS. As earlier described, the sorter and trap of FIGS. 8 and 9, respectively, incorporate known superconductor logic elements. As an aid in understanding of those inventions, and the claims, which follow this specification, some definitions of those elements and schematics thereof may prove helpful and are included.

Figure 10A:
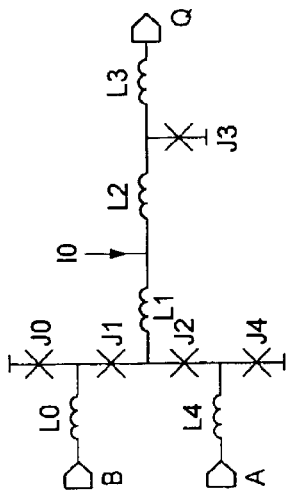
FIGS. 10a–10h are schematics of the prior art SFQ components used in the respective sorter and trap inventions of FIGS. 8 and 9; specifically.
Figure 10B:
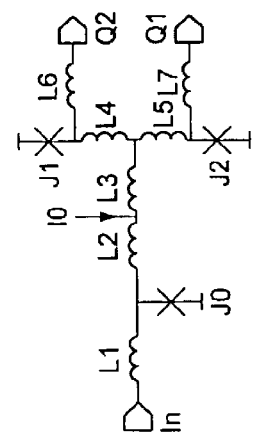
Figure 10C:
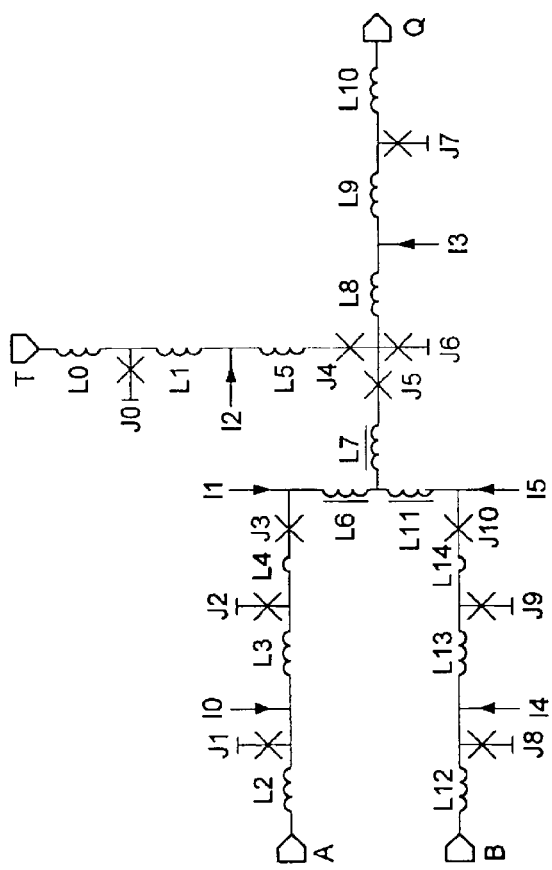
Figure 10E:
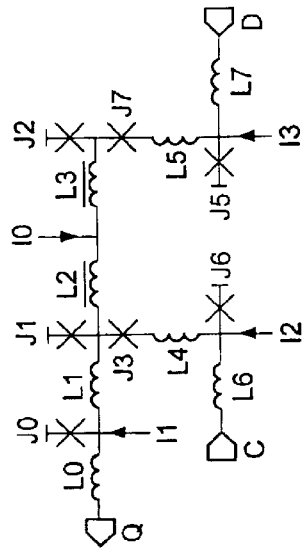
Figure 10D:
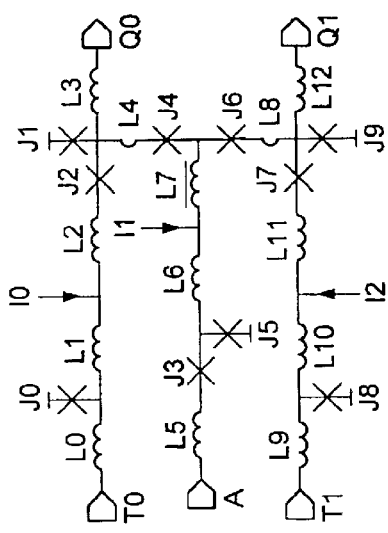
Figure 10F:
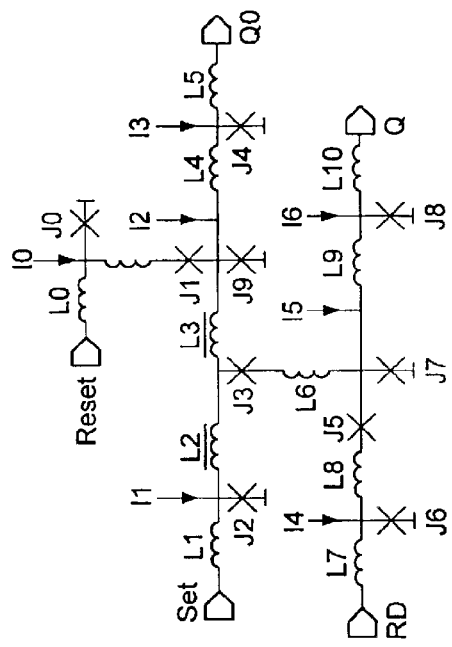
Figure 10H:
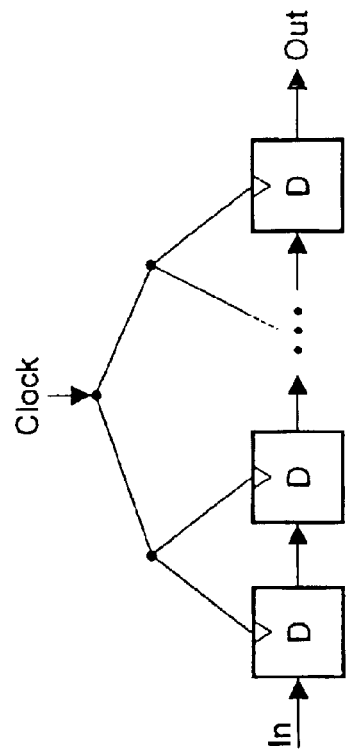
Figure 10G:
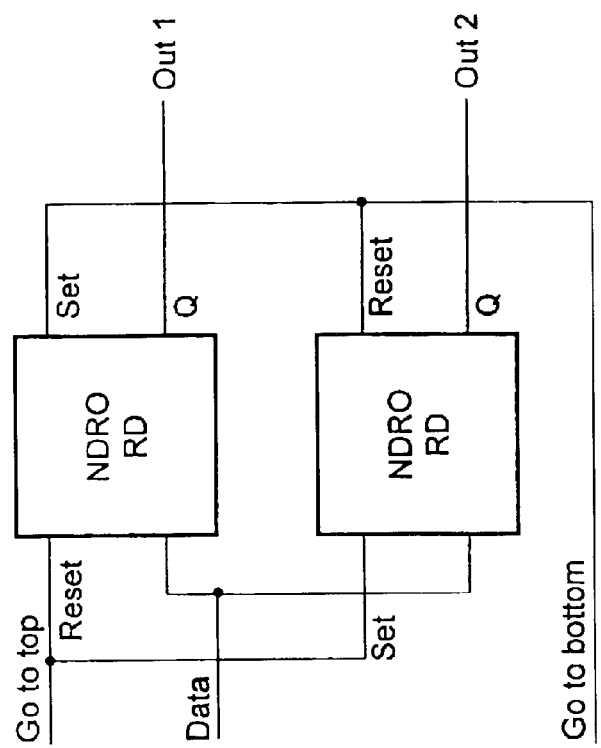
Figure 10J:
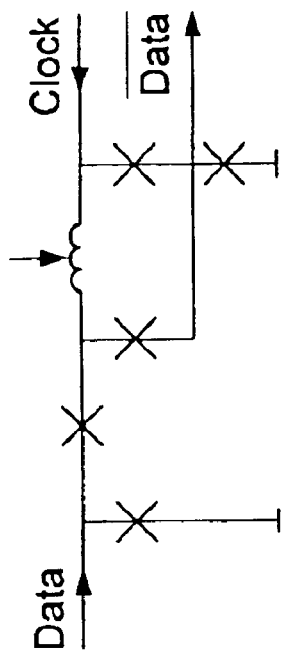
FIG. 10j illustrates the SFQ inverter circuit used in the inverter of FIG. 10i.
Figure 10I:
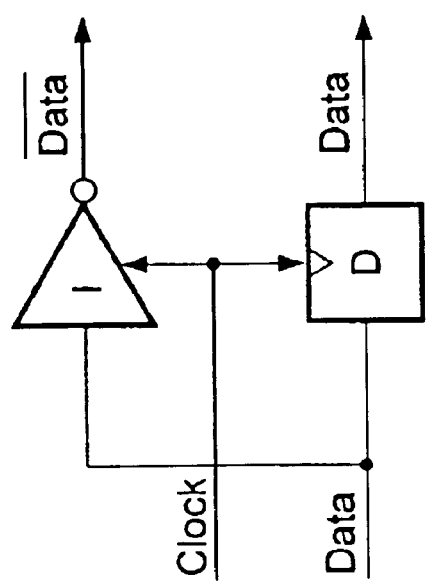
FIG. 10i illustrates an SFQ D flip-flop with complimentary outputs (DFFC)

FIGS. 10a–10h are schematics of the SFQ components used in the respective sorter and trap inventions of FIGS. 8 and 9. Specifically, FIG. 10a illustrates an SFQ pulse splitter; FIG. 10b illustrates an SFQ pulse merger (device); FIG. 10c illustrates an SFQ clocked Exclusive OR (XOR); FIG. 10d illustrates an SFQ $D^2$ flip-flop (or latch); FIG. 10e illustrates an SFQ D flip-flop; FIG. 10f illustrates an SFQ Non-Destructive Read-Out (NDRO) flip-flop (memory cell); FIG. 10g illustrates an SFQ NDRO demux; FIG. 10h illustrates an SFQ shift register; FIG. 10i illustrates an SFQ D flip-flop with complementary outputs (DFFC latch); and FIG. 10j illustrates the SFQ inverter that is symbolically illustrated in the DFFC latch of FIG. 10l, all of which are conventional in SFQ structure and known. A more detailed description of the components shown in the schematics of FIGS. 10a through 10g and possible component values is presented in the technical article by Bunyk, Likharev and Zinoviev, *International Journal of High Speed Electronics and Systems*, Vol. 11, No. 1 (2001) p 257–305, copyright World Scientific Publishing Company to which the interested reader may make reference.

SFQ Pulse splitter. An SFQ pulse splitter (FIG. 10a) contains a single input and two outputs. The pulse splitter functions to generate pulses at both outputs when an SFQ pulse arrives at the input.

SFQ Pulse merger. The pulse merger (FIG. 10b) contains two inputs and a single output. The merger sends pulses to the output from both of the inputs. This function is opposite to that of the pulse splitter.

SFQ XOR gate. An XOR (e.g. exclusive OR) gate contains two data inputs (A and B), a clock input and a single output (see FIG. 10c). When a SFQ pulse arrives on the data input (A or B), the pulse is stored inside the gate as a single flux quantum. If, thereafter, another SFQ pulse arrives at the other input (B or A), the gate cancels (terminates) the stored SFQ, and the gate is returned to the initial state. When a clock pulse arrives at the clock input, the gate state is read out. If at that time an SFQ is being stored by the gate, that SFQ is read out to the output. If no SFQ is stored, then the read does not produce an output. The latter result corresponds to the case when either no data SFQ pulses have arrived at the gate inputs since the last clock pulse or SFQ pulses arrived on both inputs A and B and cancelled one another. In any case, after the arrival of the clock pulse, The XOR gate is reset to an initial state of 0/0.

It should be recognized that in this specification an SFQ pulse is referred to as a "1" (or high) and the absence of an SFQ pulse is referred to as a "0" (or low) for convenience of explanation. That permits the description of operation to employ the more common expressions used in binary digital technology. Thus for the SFQ XOR gate, an SFQ pulse to one input is referred to as a "1" and the absence of such a pulse at the second input is referred to as a "0". The two inputs being different, the output of the gate will be a "1."

SFQ $D^2$ latch. The $D^2$ latch (or, as otherwise termed, flip-flop) is a basic storage and decision making latch in RFSQ logic (see FIG. 10d). The latch contains one data input, two clock inputs and two outputs. Each clock input is associated with a respective one of the two outputs. A data pulse is stored within the gate and waits for a clock pulse at either clock input. When a clock pulse arrives at one of the clock inputs, the gate reads out the state of the gate to the particular output associated with the foregoing clock input, and resets the gate to the initial state. If a pulse is stored in the gate, the SFQ pulse is outputted (a "1"). If the gate is empty, that is, the gate is not then storing an SFQ pulse, when a clock pulse arrives, no output is produced (a "0"), and the gate remains in the initial state.

SFQ D Flip-Flop. The D Flip-Flop contains a single data input, two outputs and a single clock input (see FIG. 10e).

The first data pulse to arrive at the input following a clock pulse (at the clock input) is stored inside the flip-flop, and subsequent data pulses are ignored. When a clock pulse arrives and the latch is in the "1" state, a pulse is produced on one output. If, when the clock pulse arrives, the latch is in the "0" state, a pulse is produced on the other of the two outputs. In any case the state of the gate is reset to or remains in the "0" state by the clock pulse.

SFQ NDRO flip-flop. NDRO is the acronym for Non-Destructive Read-Out and, unlike the other latches described herein, the flip-flop is not reset to the original state when the flip-flop is "read out". The flip-flop contains Set and Reset inputs, read-out input and an output (see FIG. 10f). If the NDRO flip-flop is in the "1" state, pulses arriving on the read-out input are permitted to effectively propagate through the flip-flop and appear on the output. If in the "0" state, all read-out pulses are ignored.

SFQ NDRO demux. The NDRO demux may be viewed as a combination of two NDRO flip flops that are set in opposite states, "1" and "0", respectively, as example (see FIG. 10g). When the demux is Set, read-out pulses propagate on one output. After the demux is Reset, read-out pulses start propagating to the other output.

SFQ Shift Register. The SFQ shift register (or FIFO device) receives and temporarily stores digital bits which are entered into the shift register in serial order bit by bit with clock pulses applied to a clock input until the stages of the shift register are filled. Thereafter, as each additional clock pulse is applied to the clock input the first digital bit that was entered into the register is shifted out. New digital bits as may be applied to the input with each additional digital bit may be entered into the device simultaneously with the shifting of a previously stored bit toward the output. The shift register may be implemented as a chain of D flip-flops (see FIG. 10h).

SFQ DFFC latch. DFFC is the acronym for "D Flip-Flop with Complimentary outputs". The DFFC latch contains a single data input, two outputs and a single clock input, an Inverter in parallel with a D flip-flop (see FIG. 10i). The first data pulse to arrive at the input following a clock pulse (at the clock input) is stored inside the latch, and subsequent data pulses are ignored. When a clock pulse arrives and the latch is in the "1" state, a pulse is produced on one output. If, when the clock pulse arrives, the latch is in the "0" state, a pulse is produced on the other of the two outputs. In any case the state of the gate is reset to or remains in the "0" state by the clock pulse. A more detailed schematic of the SFQ inverter used in the foregoing latch is illustrated in FIG. 10j.

It is believed that the foregoing description of the preferred embodiments of the invention is sufficient in detail to enable one skilled in the art to make and use the invention without undue experimentation. However, it is expressly understood that the detail of the elements comprising the embodiment presented for the foregoing purpose is not intended to limit the scope of the invention in any way, in as much as equivalents to those elements and other modifications thereof, all of which come within the scope of the invention, will become apparent to those skilled in the art upon reading this specification. Thus, the invention is to be broadly construed within the full scope of the appended claims.

What is claimed is:

1. An SFQ Batcher bit-serial sorter for routing separate digital packets simultaneously received at a pair of inputs between first and second outputs in accordance with the address and priority information in said digital packets, said priority information providing a priority level for said respective data packet, so that a first data packet that is received at one of said pair of inputs and contains an address that is larger than an address of a second data packet that is received at the other one of said pair of inputs is routed to the first output while said second data packet is routed to the second output or in response to occurrence of of an address contention the one of said first and second data packets that contains the lesser priority level is rejected, comprising:

an SFQ exclusive OR gate, said OR gate containing two data inputs, an output and a clock input;

first, second, third, fourth, fifth, sixth and seventh SFQ D2-flip-flops, each of said flip-flops including first control ("T0") and second control ("T1") inputs, a data input, and first ("Q1") and second ("Q") outputs;

an SFQ non-destructive read-out device ("NDRO"), said read-out device having a data input, a set ("S") input, a reset ("R") input and a pair of outputs, Q and Qbar, said outputs being in complementary relationship;

first and second inputs;

first and second SFQ pulse splitters, each of said pulse splitters including an input and first and second outputs;

MAX and MIN outputs;

a clock input; a packet start input; a priority end input;

said first and second inputs being coupled, respectively, via said first and second pulse splitters, to said first and second inputs, respectively, of said exclusive OR gate;

said output of said Exclusive OR gate coupled to said T0 input of said first D2 flip-flop;

said data input of said second and third D2 flip flops being connected respectively via said first and second pulse splitters, respectively, to said first and second inputs;

said data input of said first D2 flip flop being coupled to said Packet Start input for receiving an SFQ pulse representing the start of transmission of data packets, respectively, to said first and second inputs;

said T1 input of said first D2 flip flop being coupled to said priority end input for receiving an SFQ pulse representing the completion of transmission of the priority data information in said data packets during transmission of said data packets, respectively, to said first and second inputs;

said Q1 output of said first D2 flip flop being left open;

third, fourth and fifth SFQ pulse splitters, each of said pulse splitters including an input and first and second outputs;

said clock input being coupled to said input of said third SFQ pulse splitter;

said first output of said third pulse splitter being coupled to said clock input of said Exclusive OR gate and said second output of said third pulse splitter being connected to said input of said third pulse splitter;

said first output of said third pulse splitter being coupled to said T0 input of said second D2 flip-flop and to said input of said fourth pulse splitter for distributing clock pulses applied to said input of said third pulse splitter to said second D2 flip flop and said fourth pulse splitter;

said first output of said fourth pulse splitter being coupled to said data input of said NDRO demux and said second output of said fourth pulse splitter being coupled to said T0 input of said third D2 flip flop for distributing clock pulses applied to said input of said fourth pulse splitter to said NDRO demux and to said fourth D2 flip flop;

a sixth SFQ pulse splitter;

said input of said sixth SFQ pulse splitter being coupled to said Q0 output of said first D2 flip flop for receiving an SFQ pulse when outputted from said first D2 flip flop;

said first and second outputs of said sixth SFQ pulse splitter being coupled respectively to said T1 inputs of said second and third D2 flip flops;

seventh and eighth SFQ pulse splitters, each of said seventh and eighth pulse splitters including an input and first and second outputs;

first and second SFQ merge devices, each of said SFQ merge devices, including first and second inputs and an output for merging SFQ pulses as may occur at said first and second inputs at said output;

said Q1 output of said second D2 flip flop being coupled to a first input of said seventh SFQ pulse splitter;

said first output of said seventh SFQ pulse splitter being coupled to said first input of said first SFQ merge device and said second output of said seventh SFQ pulse splitter being coupled to said S input of said NDRO device;

said Q1 output of said third D2 flip flop being coupled to a first input of said eighth SFQ pulse splitter;

said first output of said eighth SFQ pulse splitter being coupled to said first input of said second SFQ merge device and said second output of said eighth SFQ pulse splitter being coupled to said R input of said NDRO device;

said Q0 output of said second D2 flip flop being coupled to said second input of said first SFQ merge device, and said output of said first SFQ merge device being connected to said data input of said fourth D2 flip flop;

said Q0 output of said third D2 flip flop being coupled to said second input of said second SFQ merge device, and said output of said second SFQ merge device being connected to said data input of said fifth D2 flip flop;

ninth, tenth and eleventh SFQ pulse splitters, each of said pulse splitters including an input and first and second outputs;

said input of said ninth SFQ pulse splitter being coupled to said Q output of said NDRO device;

said first output of said ninth SFQ pulse splitter being coupled to said input of said tenth SFQ pulse splitter and said second output of said ninth SFQ pulse splitter being coupled to said input of said eleventh SFQ pulse splitter;

said first and second outputs of said eleventh SFQ pulse splitter being respectively coupled to said T0 inputs of said fourth and fifth D2 flip flops;

twelfth, thirteenth and fourteenth SFQ pulse splitters, each of said pulse splitters including an input and first and second outputs;

said input of said twelfth SFQ pulse splitter being coupled to said Qbar output of said NDRO device;

said first output of said twelfth SFQ pulse splitter being coupled to said input of said thirteenth SFQ pulse splitter and said second output of said twelfth SFQ pulse splitter being coupled to said input of said fourteenth SFQ pulse splitter;

said first and second outputs of said fourteenth SFQ pulse splitter being respectively coupled to said T1 inputs of said fourth and fifth D2 flip flops;

third and fourth SFQ merge devices, each of said third and fourth SFQ merge devices, including first and second inputs and an output for merging SFQ pulses as may occur at said first and second inputs at said output;

said first input and second inputs of said third SFQ merge device being respectively connected to said Q0 output of said fourth D2 flip flop and said Q1 output of said fifth D2 flip flop, and said output of said third SFQ merge device being connected to said MAX output;

said first input and second inputs of said fourth SFQ merge device being respectively connected to said Q0 output of said fifth D2 flip flop and said Q1 output of said fourth D2 flip flop, and said output of said third SFQ merge device being connected to said MIN output.

2. The SFQ Batcher bit-serial sorter as defined in claim 1, further comprising:

first and second collision inputs for respectively receiving any data packet that encountered a collision following output from said MAX output and any data packet that encountered a collision following output from said MIN output;

first and second collision outputs;

sixth and seventh D2 flip flops, each of said flip flops having a data input, a T0 and a T1 control inputs and Q0 and Q1 outputs;

fifth and sixth SFQ merge devices, each of said fifth and sixth SFQ merge devices, including first and second inputs and an output for merging SFQ pulses as may occur at said first and second inputs at said output;

said data input of said sixth D2 flip flop being coupled to said first collision input and said data input of said seventh SFQ D2 flip flop being coupled to said second collision input;

said Q0 output of said sixth SFQ D2 flip-flop and said Q1 output of said seventh SFQ D2 flip-flop being connected, respectively, to said first and second inputs of said fifth merge device; and said output of said fifth merge device being coupled to said first collision output;

said Q0 output of said seventh SFQ D2 flip-flop and said Q1 output of said sixth SFQ D2 flip-flop being connected, respectively, to said first and second inputs of said sixth merge device; and said output of said sixth merge device being coupled to said second collision output;

said second output of said ninth SFQ pulse splitter being connected to said input of said tenth SFQ pulse splitter; and said first and second outputs of said tenth SFQ pulse splitter being connected, respectively, to said T0 inputs of said sixth and seventh SFQ D2 flip flops;

said second output of said twelfth SFQ pulse splitter being connected to said input of said thirteenth SFQ pulse splitter; and said first and second outputs of said thirteenth SFQ pulse splitter being connected, respectively, to said T1 inputs of said sixth and seventh SFQ D2 flip flops.

* * * * *